United States Patent
Seong et al.

(10) Patent No.: US 9,365,025 B2
(45) Date of Patent: Jun. 14, 2016

(54) METHOD FOR FORMING FINE PATTERNS ON A SUBSTRATE WITH A DISPOSABLE CLICHE

(75) Inventors: Jie-Hyun Seong, Daejeon (KR); Seung-Heon Lee, Seoul (KR); Young-Jun Hong, Daejeon (KR); Ji-Su Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 674 days.

(21) Appl. No.: 12/595,683

(22) PCT Filed: Apr. 14, 2008

(86) PCT No.: PCT/KR2008/002094
§ 371 (c)(1),
(2), (4) Date: Oct. 13, 2009

(87) PCT Pub. No.: WO2008/127055
PCT Pub. Date: Oct. 23, 2008

(65) Prior Publication Data
US 2010/0139513 A1    Jun. 10, 2010

(30) Foreign Application Priority Data

Apr. 13, 2007    (KR) .................. 10-2007-0036402

(51) Int. Cl.
*B41F 35/00*    (2006.01)
*B41F 3/10*    (2006.01)
(Continued)

(52) U.S. Cl.
CPC ... *B41F 3/10* (2013.01); *B41F 3/36* (2013.01); *B41F 35/00* (2013.01); *B41N 3/003* (2013.01); *G02F 1/133516* (2013.01)

(58) Field of Classification Search
USPC ........ 101/252, 215, 416.1, 420, 425, 478, 41, 101/44, 150, 163, 389.1, 492, 493; 264/511, 316; 118/211, 212, 213; 156/323; 977/887
See application file for complete search history.

(56) References Cited

U.S. PATENT DOCUMENTS 4,034,671 A * 7/1977 Bach ........................... 101/451
5,272,980 A * 12/1993 Takeuchi et al. ............ 101/481
(Continued)

FOREIGN PATENT DOCUMENTS

JP    09-029927 A    2/1997
JP    2006-179215 A    7/2006
(Continued)

OTHER PUBLICATIONS

Wikipedia, Nov. 10, 2005; "Polyethylene Terephthalate".*
(Continued)

*Primary Examiner* — Justin Olamit
(74) *Attorney, Agent, or Firm* — Rothwell, Figg, Ernst & Manbeck, P.C.

(57) ABSTRACT

A method for forming fine patterns includes (S1) closely contacting a cliche-forming film to a hard mold concavely patterned, thereby making a disposable cliche; (S2) coating an elastic blanket cylinder with ink or resin; (S3) compressing the elastic blanket cylinder to the disposable cliche to remove ink or resin on a surface of the elastic blanket cylinder at a portion contacting with a relatively protruded embossed portion of the disposable cliche; and (S4) transcribing ink or resin remaining on the surface of the elastic blanket cylinder to a substrate. This method allows simple and fast works and greatly reduces costs by adopting a disposable cliche that may be easily installed and removed. Also, this method may be effectively utilized to form a fine pattern of an electronic device or a display device such as color filter and electrode.

12 Claims, 4 Drawing Sheets

(51) Int. Cl.
*B41F 3/36* (2006.01)
*B41N 3/00* (2006.01)
*G02F 1/1335* (2006.01)

(56) References Cited

U.S. PATENT DOCUMENTS

| | | | | |
|---|---|---|---|---|
| 5,846,477 | A | * | 12/1998 | Hotta et al. .................... 264/511 |
| 5,891,384 | A | * | 4/1999 | Miyajima ...................... 264/511 |
| 6,566,039 | B1 | * | 5/2003 | Teng ......................... B41M 1/06 101/450.1 |
| 6,584,743 | B2 | * | 7/2003 | Paxton et al. ..................... 52/312 |
| 7,140,296 | B2 | * | 11/2006 | Baek et al. ..................... 101/170 |
| 7,595,017 | B2 | * | 9/2009 | Siegel et al. ............... 264/272.17 |
| 7,829,257 | B2 | * | 11/2010 | Oka et al. .................... 430/270.1 |
| 7,914,691 | B2 | * | 3/2011 | Kim ................................ 216/41 |
| 2002/0001026 | A1 | * | 1/2002 | Ishikawa et al. ............... 347/101 |
| 2007/0056456 | A1 | * | 3/2007 | Kwon et al. ................ 101/401.1 |

FOREIGN PATENT DOCUMENTS

| | | | |
|---|---|---|---|
| JP | 2006-272606 | A | 10/2006 |
| JP | 2006327116 | A * | 12/2006 |
| KR | 10-1999-023991 | A | 3/1999 |
| TW | 200709859 | B | 3/2007 |

OTHER PUBLICATIONS

Office Action issued in Taiwanese Patent Application No. 097113176 dated Jun. 6, 2012, along with English translation, 7 pages.

\* cited by examiner

WASHING AND DRYING OF CLICHE

METHOD FOR FORMING FINE PATTERNS ON A SUBSTRATE WITH A DISPOSABLE CLICHE

CROSS REFERENCE TO RELATED APPLICATIONS

This application is a 35 U.S.C. §371 National Phase Entry Application from PCT/KR2008/002094, filed Apr. 14, 2008, and designating the United States, which claims priority under 35 U.S.C. §119 to Korean Patent Application No. 10-2007-0036402 filed Apr. 13, 2007, which is incorporated herein in its entirety.

TECHNICAL FIELD

The present invention relates to a method for forming fine patterns, and more particularly to a method for forming fine patterns, which may exclude a separate cliche washing process from a reverse offset printing procedure using a concavely patterned cliche and an elastic blanket made of silicon-based rubber material, thereby allowing simple process and reduced costs.

BACKGROUND ART

Reverse offset printing is a kind of offset printing method, which is an indirect printing method. In the reverse offset printing, a substrate (a subject for printing) is not directly printed on a plate, but, an elastic blanket acting as an intermediating function is coated with an ink, then unnecessary portions are taken off using a concavely patterned cliche, and then the ink remaining on the elastic blanket is printed onto the substrate. The offset printing uses the elastic blanket as a medium, so it may be applied to a hard substrate made of metal or glass, to which a direct printing method is not easily applied.

FIG. 1 is a schematic view showing a printing procedure for the conventional reverse offset printing. Referring to FIG. 1, a printing ink 112 is firstly applied to an elastic blanket cylinder 111, and then the elastic blanket cylinder 111 coated with the ink 112 is compressed to a hard cliche 115 such that an ink contacting with a relatively protruded embossed portion of the cliche 115 is removed by means of an embossed portion of the cliche 115. Then, the ink 112 remaining on the surface of the elastic blanket cylinder 111 is transcribed to a substrate 116 to form a fine pattern. After that, in order to repeat such a printing process, the hard cliche 115 is washed and dried such that the ink 112 stuck to the hard cliche 115 is removed to repeat such a printing process.

In case of the conventional offset printing method using the hard cliche 115, the cliche 115 should be washed and dried so as to repeat the printing process, which requires complicated procedure, consumes much time and increasing a printing cost. Thus, there have been continuous endeavors in the art to solve the above problems, and the present invention is designed under such circumstances.

DISCLOSURE OF INVENTION

Technical Problem

The present invention is directed to solving the above problems occurring when a conventional offset printing method is used, and therefore it is an object of the present invention to provide a method for forming fine patterns, which allows to execute a printing process in a simpler and faster way and also to reduce costs.

Technical Solution

In order to accomplish the above object, the present invention provides a method for forming fine patterns, which includes (S1) closely contacting a cliche-forming film to a hard mold concavely patterned, thereby making a disposable cliche; (S2) coating an elastic blanket cylinder with ink or resin; (S3) compressing the elastic blanket cylinder to the disposable cliche to remove ink or resin on a surface of the elastic blanket cylinder at a portion contacting with a relatively protruded embossed portion of the disposable cliche; and (S4) transcribing ink or resin remaining on the surface of the elastic blanket cylinder to a substrate.

Preferably, the step (S1) for forming a disposable cliche may be executed in a way that a hole for air inhalation is formed in the hard mold, and an air is sucked in through the hole to vacuum-contact the cliche-forming film to the hard mold, thereby making a disposable cliche. In addition, the step (S1) may also be executed in a way that the cliche-forming film is placed between the hard mold and a complementary hard mold having a pattern complementary with the hard mold, the complementary hard mold and the hard mold are fit with each other by compression, and then the complementary hard mold is taken off to make a disposable cliche.

The hard mold may be made of a material selected from the group consisting of glass, metal, metal oxide and plastic, and the hard mold may be concavely patterned using a method selected from the group consisting of wet etching, dry etching, photography and laser forming. However, material and forming method of the hard mold are not limited to the above examples.

The cliche-forming film preferably has a thickness of 70 μm or less. Also, the cliche-forming film preferably has a surface energy greater than that of the ink. In addition, the cliche-forming film is preferably made of a material with a low price since it is disposable. The cliche-forming film satisfying the above conditions may be a polyethylene film, a polyethylene terephthalate film or an aluminum film, but not limitedly.

The elastic blanket cylinder is preferably made by coating a cylindrical roll with an elastic rubber, or by mounting a flat plate pad with an elastic rubber to an outside of a cylindrical roll. Here, the elastic rubber is preferably a silicon rubber, but not limitedly.

The ink or resin for forming a fin pattern is preferably a thermosetting or photocuring ink or resin, and the ink or resin may be applied to the elastic blanket cylinder in various ways such as slot die coating, bar coating, knife coating and roll coating, but not limitedly.

BRIEF DESCRIPTION OF THE DRAWINGS

Other objects and aspects of the present invention will became apparent from the following description of embodiments with reference to the accompanying drawing in which.

BEST MODE FOR CARRYING OUT THE INVENTION

Figure 1:
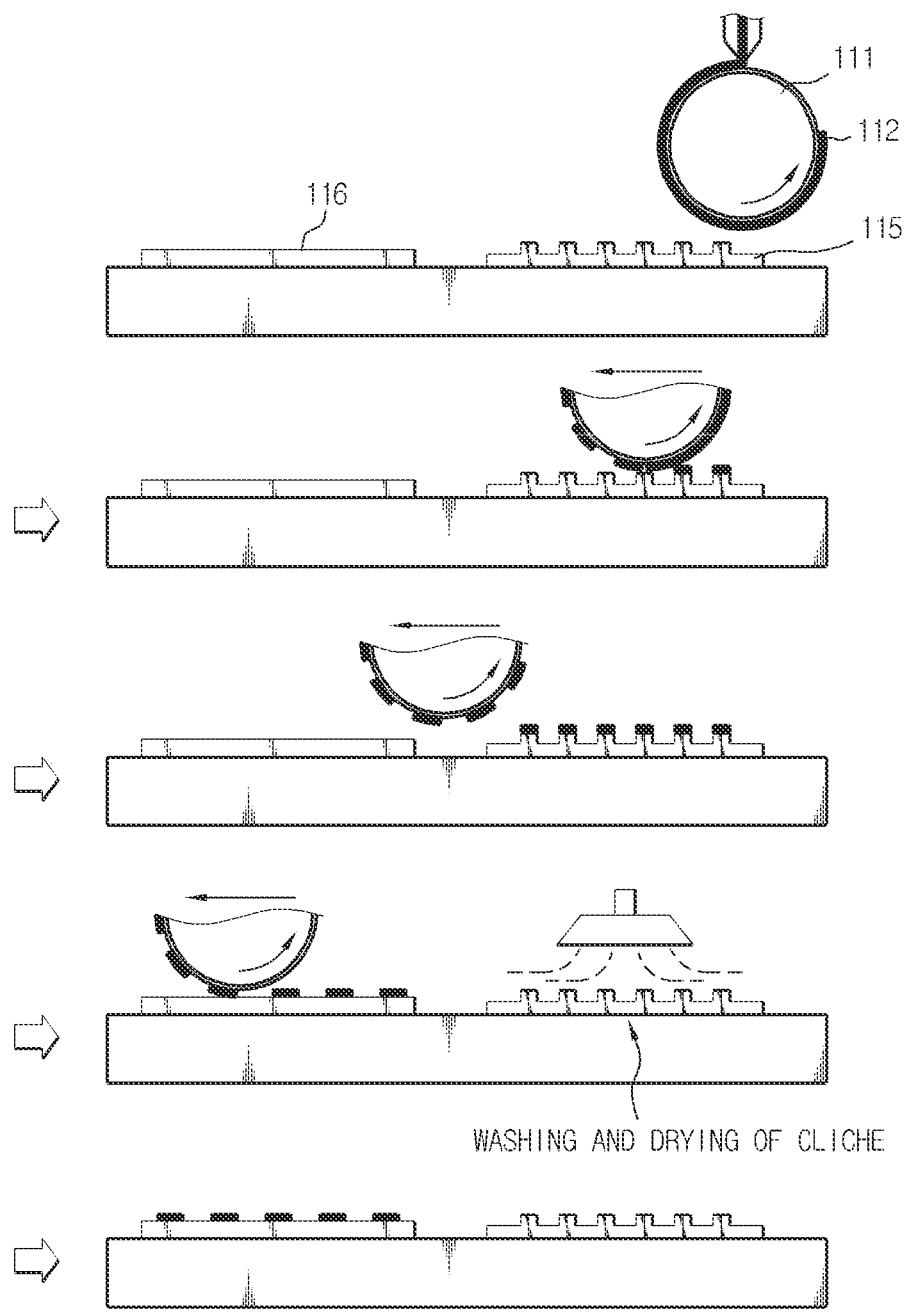
FIG. 1 is schematic view showing a printing process using a conventional reverse offset printing method.
Figure 2:
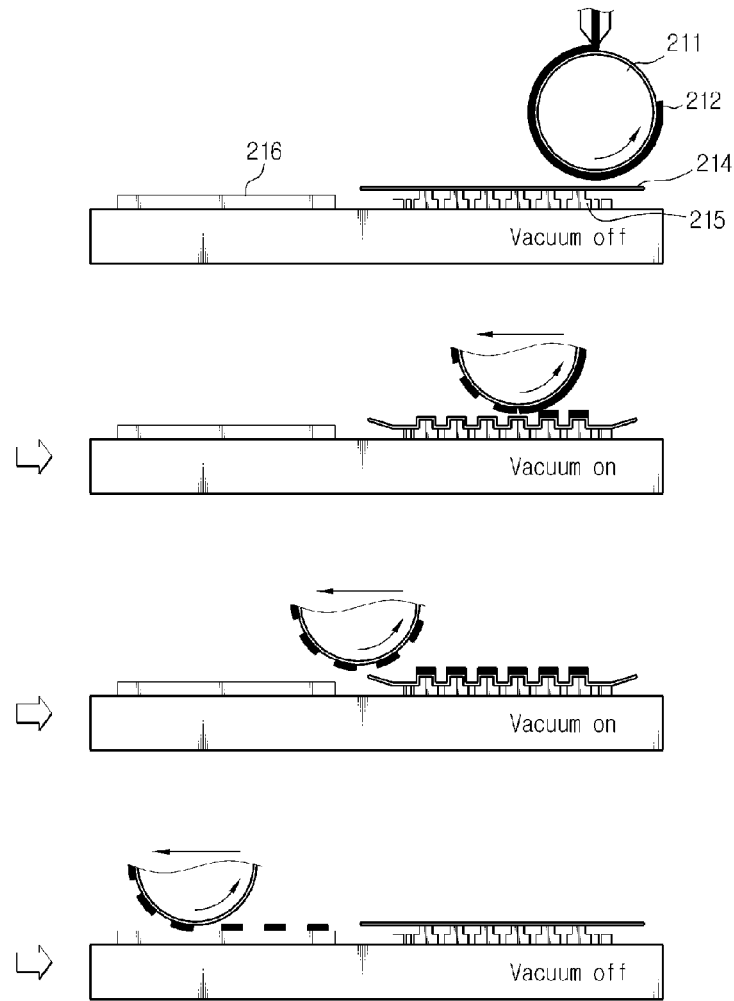
FIG. 2 is a conceptual diagram showing a process of forming a fine pattern using a fine pattern forming method according to one embodiment of the present invention.

Hereinafter, preferred embodiments of the present invention will be described in detail with reference to the accompanying drawings. In order to solve problems of a conventional fine pattern forming method using a hard cliche, the present invention adopts a disposable cliche, which may be easily exchanged after one time use, thereby providing a method for forming fine patterns, which allows simple and fast processes and reduced costs since there is no need of a washing process for the cliche. FIG. 2 is a schematic view showing how a fine pattern is formed using a method for forming fine patterns according to one embodiment of the present invention. Now, the method for forming fine patterns according to the present invention is explained subsequently in the order of Steps S1 to S4 with reference to FIG. 2.

Step of Making Disposable Cliche (S1)

First, a cliche-forming film 214 is closely contacted to a concavely patterned hard mold 215 to make a disposable cliche (S1).

Figure 3:
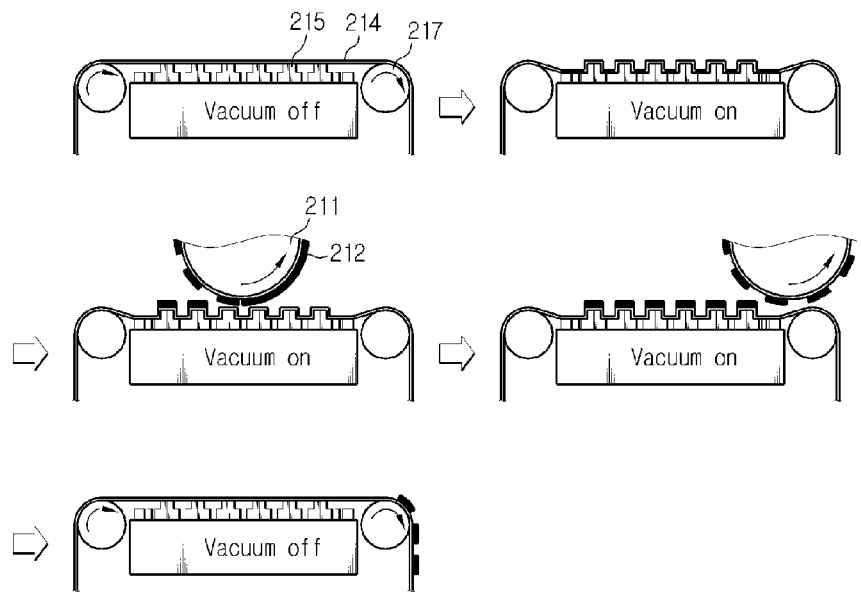
FIG. 3 is a schematic view showing a process of making a disposable cliche adopted in the fine pattern forming method according to one embodiment of the present invention.

FIG. 3 is a schematic view showing how the disposable cliche adopted in the fine pattern forming method according to one embodiment of the present invention is made. Referring to FIG. 3, if the cliche-forming film 214 is supplied on the hard mold 215, the film 214 is closely contacted on the hard mold 215.

At this time, in order to closely contact the film 214 onto the hard mold 215, it is possible to form a hole for air inhalation in the hard mold 215 and then suck in an air through the hole such that the cliche-forming film 214 is vacuum-contacted to the hard mold 215, as shown in FIG. 3.

Figure 4:
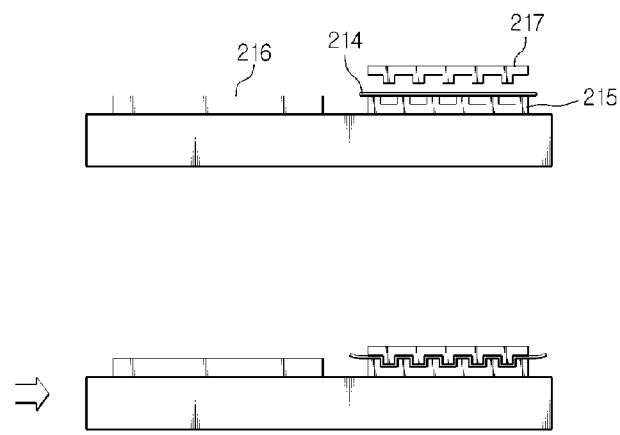
FIG. 4 is a conceptual diagram showing a process of making a disposable cliche using a complementary hard mold.

FIG. 4 is a conceptual diagram showing a process of making a disposable cliche using a complementary hard mold. As shown in FIG. 4, the cliche-forming film 214 is placed between the hard mold 215 and a complementary hard mold 217 having a pattern complementary with the hard mold 215, then the hard mold 215 and the complementary hard mold 217 are fit with each other by compression, and then the complementary hard mold 217 is taken off to prepare a disposable cliche.

If the disposable cliche is prepared as mentioned above, an elastic blanket cylinder 211 coated with an ink 212 is compressed to the disposable cliche such that the ink 212 is stuck to a protruded embossed portion of the disposable cliche, and thus the elastic blanket cylinder 211 is coated with the ink 212 to have a desired pattern. After this process, the film 214 to which the ink 212 is stuck is removed, and then a new film 214 is supplied to make and use another disposable cliche. This procedure is repeated.

Figure 5:
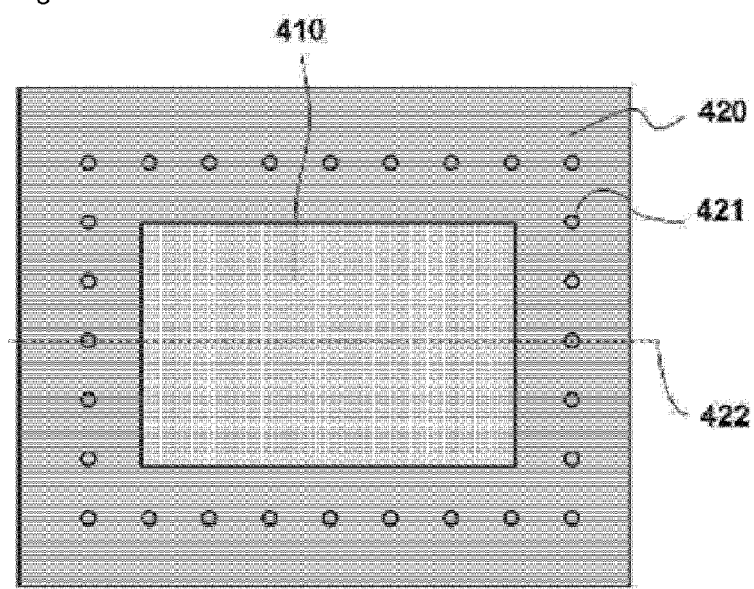
FIGS. 5 to 7 are diagrams showing an example of a hard mold suitable for making a disposable cliche using a vacuum contact method.
Figure 6:
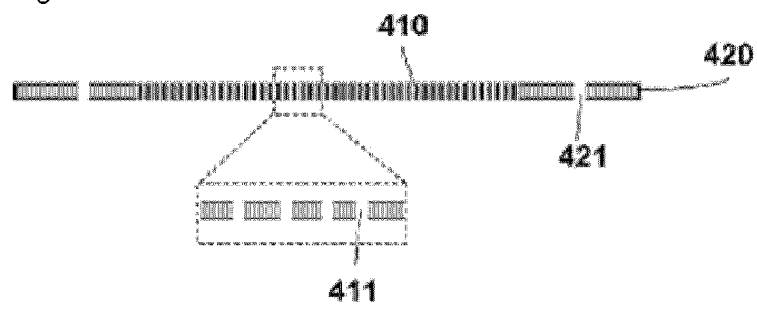
Figure 7:
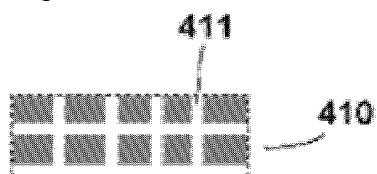

FIGS. 5 to 7 show an example of a hard mold suitable for making a disposable cliche using a vacuum-contact method. FIG. 5 is a schematic view showing the hard mold from a front location, FIG. 6 is a sectional view showing an intermediate portion 422 of the hard mold, and FIG. 7 is an enlarged schematic view showing a patterned portion 410 of the hard mold of FIG. 6, from a front location. As shown in FIGS. 5 to 7, in order to closely contact the film 214 to the hard mold 215, at least one vacuum hole 421 for air inhalation may be formed in a non-patterned margin 420 of the hard mold 215, and a hole may be formed over an entire concave portion 411 in the patterned portion 410 of the hard mold 215 to make the hard mold 215 into a membrane shape.

Figure 8:
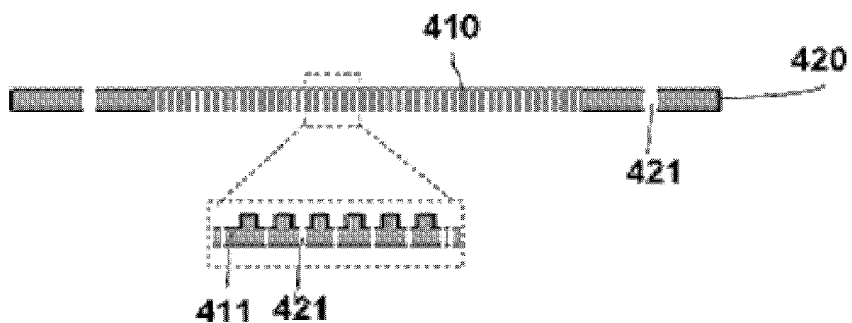
FIG. 8 is a sectional view showing an intermediate portion of a hard mold according to another embodiment of the present invention.
Figure 9:
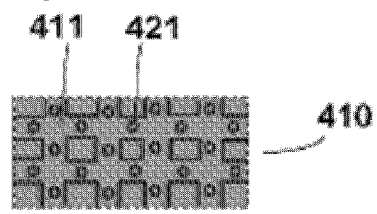
FIG. 9 is an enlarged schematic view showing a patterned portion of the hard mold of FIG. 8, from a front location.

FIG. 8 is a sectional view showing an intermediate portion 422 of a hard mold according to another embodiment of the present invention, and FIG. 9 is an enlarged schematic view showing a patterned portion of the hard mold of FIG. 8. As shown in the embodiment of FIGS. 8 and 9, it is possible to form a vacuum hole 421 in a part of the concave portion, instead of forming a hole over the entire concave portion 411.

The hard mold 215 may be representatively made of glass, metal, metal oxide, plastic and so on, and a concave pattern may be formed in various ways such as wet etching, dry etching, photolithography and laser forming, but not limitedly. The cliche-forming film 214 has a thickness sufficiently smaller than a pattern step of the hard mold 215 such that the cliche-forming film 214 makes a conformal contact with the hard mold 215. Specifically, the cliche-forming film 214 preferably has a thickness of 70 μm or less, more preferably 20 μm or less.

In addition, the cliche-forming film 214 is preferably made of a material that has price competitiveness and is not well torn when a vacuum is applied thereto, such that the cliche-forming film 214 may be used as a disposable article. In addition, the cliche-forming film 214 preferably has a surface energy greater than that of ink or resin. Such a film 214 may be a polyethylene film, a polyethylene terephthalate film or an aluminum film, but not limitedly.

Step of Coating Elastic Blanket Cylinder with Ink (S2)

Then, fine pattern-forming ink or resin 212 is applied to the elastic blanket cylinder 211 (S2). The elastic blanket cylinder 211 may be representatively made by coating a cylindrical roll with an elastic rubber, or by mounting a flat plate pad with an elastic rubber to an outside of a cylindrical roll. Here, the elastic rubber may be representatively a silicon rubber, but not limitedly. The ink or resin 212 for forming a fine pattern may use any material commonly used in the related field. In particular, the ink or resin 212 is preferably a thermosetting or photo-curing ink or resin. The ink or resin 212 is applied to the elastic blanket cylinder 211 by using various coating methods such as slot die coating, bar coating, knife coating and roll coating, but not limitedly.

Step of Forming Pattern on Surface of Elastic Blanket Cylinder (S3)

Then, the elastic blanket cylinder 211 coated with the ink or resin 212 is compressed to the disposable cliche so as to transcribe the ink or resin at a portion contacting with a relatively protruded embossed portion of the cliche from the surface of the elastic blanket cylinder 211 to the embossed portion of the cliche and thus remove the ink or resin (S3). In this way, a desired pattern is formed in the ink or resin formed on the surface of the elastic blanket cylinder 211.

Step of Transcribing Pattern to Substrate (S4)

Through the above processes, a pattern of the ink or resin 212 is formed on the surface of the elastic blanket cylinder 211. If this pattern is transcribed to a substrate 216, a fine pattern is formed on an upper surface of the substrate (S4).

The fine pattern forming method according to the present invention, including the steps S1 to S4, may be effectively utilized to form a fine pattern of an electronic device or a display device such as color filter and electrode.

The present invention has been described in detail. However, it should be understood that the detailed description and specific examples, while indicating preferred embodiments of the invention, are given by way of illustration only, since various changes and modifications within the spirit and scope of the invention will became apparent to those skilled in the art from this detailed description.

INDUSTRIAL APPLICABILITY

According to the present invention, it is possible to provide a fine pattern forming method, which may allow simple and fast works and greatly reduce costs by adopting a disposable cliche that may be easily installed and removed. Thus, the fine pattern forming method of the present invention may be effectively utilized to form a fine pattern of an electronic device or a display device such as color filter and electrode.

What is claimed is:

1. A method for forming a fine pattern, comprising:
   (S1) contacting a cliche-forming film to a patterned hard mold, to make a disposable cliche;
   (S2) coating an elastic blanket cylinder with ink or resin;
   (S3) compressing the elastic blanket cylinder to the disposable cliche to remove ink or resin on a surface of the elastic blanket cylinder at a portion contacting with a relatively protruded embossed portion of the disposable cliche; and
   (S4) transcribing ink or resin remaining on the surface of the elastic blanket cylinder to a substrate,
   wherein the cliche-forming film has a thickness of 70 µm or less,
   wherein the cliche-forming film has a surface energy greater than that of the ink,
   wherein the step (S1) further comprises placing the cliche-forming film between the hard mold and a complementary hard mold, compressing the hard mold and the complementary hard mold to fit with each other, and taking off the complementary hard mold, and wherein the cliche-forming film is selected from the group consisting of a polyethylene film and a polyethylene terephthalate film.

2. The method for forming a fine pattern according to claim 1, wherein the hard mold is made of a material selected from the group consisting of glass, metal, metal oxide and plastic.

3. The method for forming a fine pattern according to claim 1, wherein the hard mold is concavely patterned.

4. The method for forming a fine pattern according to claim 3, wherein the hard mold is concavely patterned by using a method selected from the group consisting of wet etching, dry etching, photography and laser forming.

5. The method for forming a fine pattern according to claim 1, wherein the elastic blanket cylinder is made by coating a cylindrical roll with an elastic rubber.

6. The method for forming a fine pattern according to claim 1, wherein the elastic blanket cylinder is made by mounting a flat plate pad with an elastic rubber to an outside of a cylindrical roll.

7. The method for forming a fine pattern according to claim 5, wherein the elastic rubber is a silicon rubber.

8. The method for forming a fine pattern according to claim 6, wherein the elastic rubber is a silicon rubber.

9. The method for forming a fine pattern according to claim 1, wherein the ink is a thermosetting or photo-curing ink.

10. The method for forming a fine pattern according to claim 1, wherein the resin is a thermosetting or photo-curing resin.

11. The method for forming a fine pattern according to claim 1, wherein the cliché-forming film is contacted to the patterned hard mold to make a disposable cliche.

12. The method for forming a fine pattern according to claim 1, further comprising taking off the complementary hard mold to make the disposable cliché in step (S1).

* * * * *